No. 878,249. PATENTED FEB. 4, 1908.
H. W. SPANG.
ELECTRIC APPARATUS FOR RAILWAY SIGNALING.
APPLICATION FILED JAN. 12, 1903.
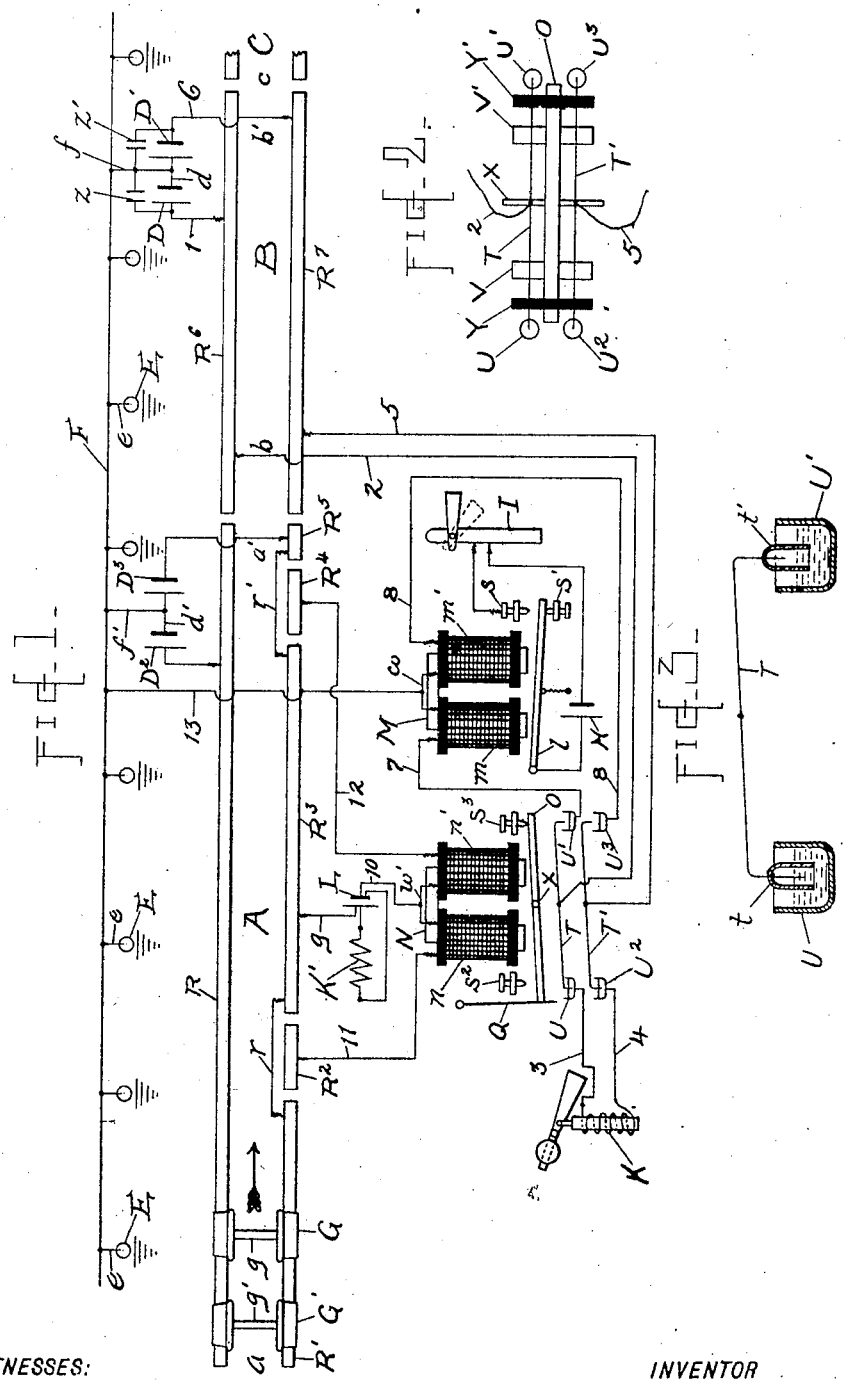
WITNESSES:
INVENTOR
Henry W. Spang
BY
ATTORNEYS

UNITED STATES PATENT OFFICE.

HENRY W. SPANG, OF NEW YORK, N. Y., ASSIGNOR, BY MESNE ASSIGNMENTS, TO CHARLES H. KETCHAM, OF YONKERS, NEW YORK.

ELECTRIC APPARATUS FOR RAILWAY SIGNALING.

No. 878,249.     Specification of Letters Patent.     Patented Feb. 4, 1908.

Application filed January 12, 1903. Serial No. 138,612.

*To all whom it may concern:*

Be it known that I, HENRY W. SPANG, a citizen of the United States, and a resident of New York city, in the county of New York and State of New York, have invented certain new and useful Improvements in Electric Circuits and Apparatus for Railway Signaling, of which the following is a specification.

In the present automatic systems of railway signaling employing constant track circuits with galvanic batteries at the forward end of a track circuit and a relay at the near end thereof and which controls a signal circuit, the wire coils of such relay are damaged and in the case of a polarized relay, the permanent magnet employed is also demagnetized or its polarity reversed during thunder-storms by the induced electricity of one leg of such track circuit flowing into the other leg thereof, via such wire coils simultaneous with a lightning discharge taking place between the clouds and the earth at a near or even distant point upon one side of the railway.

Furthermore when the armature lever of a relay constitutes part of a track or long signal circuit, its contact points are fused or damaged by such induced electricity and thereby deranging such circuit during thunder-storms.

The object of my invention is to prevent such damage or derangement of track or signal circuits which is accomplished by employing means for keeping the track relay normally out of circuit and also by connecting the track circuit, at one end thereof, with an extended ground connection system.

My invention consists also in the combination with a track circuit having a relay, of a circuit controller adapted to make and break the connection as to both terminals of the relay with the two sides of said track circuit.

It further consists in the combination of a track circuit having a relay, which controls a signal circuit, normally out of circuit, a resistance, normally in circuit and a circuit controller; the latter operating to include the resistance in circuit and simultaneously to exclude the relay, and vice versa.

It further consists in the combination of a track circuit having normally in circuit a resistance at one end thereof, and an extended ground connection system permanently connected at the opposite end thereof.

It further consists in the combination with a track or other circuit of an insulated conductor or conductors supported by and moving with the armature lever of a relay or electromagnet and making contact with mercury connections.

In the accompanying drawings, Figure 1 is a diagram illustrating one form of my invention as applied to one track of a double track system in which the trains always move in one direction as indicated by the arrow, the second or return track not being illustrated herein; Fig. 2 is a plan view of portion of an improved circuit changer or controller, and Fig. 3 is a modification thereof.

A and B are sections of railway, each about a mile long more or less; $a$, $a'$, and $b$, $b'$, are the respective ends thereof.

Rails R, R', $R^2$, $R^3$, $R^4$ and $R^5$, constitute section A, and rails $R^6$, $R^7$, section B. The rails of the respective sections are insulated from each other at their abutting ends. Rails $R^2$ and $R^4$ are insulated from the adjacent rails of section A, and each can be a single rail or two or more bonded rails. When rails $R^2$ and $R^4$ or rails $R^4$ and $R^3$ are respectively occupied by wheels G, G', and are bridged by the axles $g$, $g'$, and the metal portion of a locomotive, they constitute circuit closers. Each line of rails R, R', $R^3$ and $R^5$ of section A and rails $R^6$, $R^7$, of section B, should have metallic continuity throughout its length, by means of suitable bonds or connections at the rail joints thereof. Rails R', $R^3$ and $R^5$ of section A are connected together by metallic connectors $r$ and $r'$. Insulated rail $R^2$ of section A is preferably located about 1,000 feet ahead of end $a'$ of said section, while rail $R^4$ should preferably be near said end, so that when a locomotive reaches rail $R^2$ and a safety signal is not then given, it can be stopped before reaching rail $R^4$ and await the safety signal before passing over or making contact with rail $R^4$.

D, D', and $D^2$, $D^3$, are gravity batteries or cells, or other generators, connected in series by wires $d$ and $d'$ and constituting sectional generators.

M is a relay of suitable type located along the permanent way and consists of helices $m$, $m'$, connected together in the usual manner, or by wire $w$. When said helices are energized they attract armature lever $l$ and cause it to make contact with stop $s$, and close circuit of battery H and cause a safety signal to be given and when deënergized said lever by gravity or spring makes contact with stop $s'$ and opens said signal circuit and causes a danger signal to be given in the usual manner well known in the art.

N, is an electromagnet governing the position of a circuit changer or controller and consists of helices $n$, $n'$, connected in the usual manner by wire $w'$. The resistance of the helix $n$ can be about one ohm and that of helix $n'$ about a half ohm, or about that proportion. They are successively energized by gravity battery L, when a locomotive contacts with rail $R^2$ or $R^4$ and then causes armature lever O to move on its fulcrum, $x$, and successively engage stops $s^2$ and $s^3$. Q, is a flat spring which presses against the end of lever O, and serves to hold said lever in the position placed by either helix $n$ or $n'$ and when either is no longer energized. Normally lever O engages stop $s^3$. The parts of the circuit changer or controller may comprise circuit changing wires or other suitable conductors T, T', with bent ends or immersion points and supported and insulated from each other and metal lever O, by wooden or other non-conducting strips Y, Y', shown in Fig. 2. The said strips are fastened to armature lever O and move therewith when armatures V, V', are successively attracted by helices $n$, $n'$. Normally the circuit changing conductors T, T', make contact with mercury in the metal cups U, $U^2$, and not with mercury in metal cups $U'$, $U^3$.

K, is a suitable resistance which is normally in circuit and its function is to keep the gravity batteries D, D', of section B in proper working order. Preferably, K, can be a magnet or relay, which operates or controls an indicator which exhibits to the engineer the condition of the normal circuit through K as he approaches the signal controlled by magnet M. K' is also a resistance, higher than that of helix $n$ or $n'$, and its function is to keep the gravity battery L in proper working order.

F, is a wire or other suitable conductor extending along the entire length of a railway or parallel with any desired number of track sections and connected at suitable intervals by wires $e$, or otherwise, with ground connections E, each consisting, preferably, of an iron pipe of suitable length driven into the earth or otherwise well embedded therein preferably at or near every telegraph pole. The series of ground connections thus employed, or a suitable number thereof, afford much better electrical connection with the earth than that afforded by either line of rails of section A or B with the wooden ties, ballast and adjacent surface earth, even during the moist condition thereof. The wire F in connection with ground connections E, is highly electrified by the induction of the overhead charged clouds during a thunder storm and serves to reduce to a minimum a similar induced electrification of the rail circuit embracing batteries D, D' rails $R^6$ $R^7$ wires 2 and 5 and magnet K or signal controlling relay, and also of all other rail circuits which may be subject to such induced electrification. In fact such induced electrification of the portion of track circuit at or near end $b$, or $a$, will normally be so weak that a relay controlling a signal or indicator circuit can be safely employed in place of resistance, K, at or ahead of end $b$ of section B, or end $a$ of section A, and thereby normally indicate the condition of section B to an approaching engineer who may also be governed by the operation of home signal I normally at danger, before entering section B. Wire F is connected with wires $d$, $d'$, by wires $f$, $f'$, thereby enabling the induced electricity of track circuits of sections B and A to flow to and over ground connections E, via batteries D, D' and $D^2$, $D^3$.

It is obvious that lightning arresters Z, Z', can also be employed between wires 1 and 6 and wire $f$, or between rails $R^6$, $R^7$ and wire F and thereby provide additional paths for the discharge of such induced electricity from track circuit of section B to and over ground connections E. The intensity of such induced electrification of a track or other circuit is governed by its length and if normally closed or open, and the liability of damage to the wire coils of a magnet by such electricity is lessened by the reduced number of turns of insulated wire, as employed in a low resistance magnet in an open circuit of short length. Therefore the small number of turns of wire coils of low resistance helices $n$, $n'$, of magnet N; with the short wires 11 and 12 in connection with single rails or short sections of rails $R^2$ and $R^4$, as well as the fact that they are normally in open circuits, reduce to a minimum such induced electrification thereof and wire coils $n$ and $n'$ will not be damaged by such induced charges when flowing over them into line of rails $R^3$ via wires 9 and 10 and battery L. The signal circuit of battery H, also wires 7 and 8 connecting with helices $m$, $m'$, of relay M are very short and being normally in open circuit are then not inductively electrified during thunderstorms and even when relay M is in circuit the induced electrification of that portion of the track circuit will not be sufficient to damage the wire coils $m$, $m'$, as the greatest induced electrification of the track circuit will always be near end $b'$.

The induced electrification by overhead charged clouds of that portion of the track circuit of section B near end $b$ is also reduced to a minimum and prevented from discharging into line or rails R³ via armature lever O adjacent iron cores and, helices $n$, $n'$, of circuit changer N wires 9 and 10 and battery L by conductors T, T′, being well insulated and separated from lever O, by nonconductors Y, Y′, as shown in Fig. 2. Normally the resistance K, impedes the flow of such induced electricity from one leg of track section B into the other leg thereof and it is evident that whatever flow takes place between them via resistance K, or relay M, when in circuit, can cause no derangement of track circuit at contact points owing to the employment of conductors T, T′, with mercury connections U, $U^2$, or U′, $U^3$.

The operation of the system is as follows: When wheels G, G′, of a locomotive moving in the direction of the arrow make contact respectively with rails $R^2$, R′, the locomotive being wholly metallic, closes circuit of battery L, over wire 9, rails R³, wire $r$, rails R′, $R^2$, wire 11, helix $n$, and wire 10 energizing helix $n$ and causing lever O to engage stop $s^2$ and simultaneously, conductors T, T′, to break contact with the mercury in cups U, $U^2$, and make contact with the mercury in cups U′, $U^3$, and thereby excluding resistance K from track circuit of section B and including relay M therein. If section B is clear the current of batteries D, D′, will flow over wire 1, rails $R^6$, wire 2, conductor T, wire 7, relay M, wire 8, conductor T′, wire 5, rails $R^7$ and wire 6, in the same manner as over the ordinary metallic circuit. The energizing of helices $m$, $m'$, of relay M will cause armature lever $l$ to contact with stops $s$ and close circuit of battery H, and the signal I to assume the "safety" indication, until said wheels G, G′, make contact respectively with rails $R^4$, $R^3$, when the locomotive closes circuit of battery L, over wire 9, rails R³, $R^4$, wire 12, helix $n'$, and wire 10; even if a portion of the train is at the same time passing over rails $R^2$, helix $n'$ owing to its resistance being lower than that of helix $n$ will then be energized, causing lever O to engage stop $S^3$ and simultaneously, conductors T, T′ to break contact with the mercury in cups U′, $U^3$, and make contact with the mercury in cups U, $U^2$, thus including resistance K in said track circuit, and excluding relay M therefrom so as to cause the signal circuit of battery H to open and the signal I to assume the normal or danger indication. Lever O retains the position last stated until the current from battery L is again made to flow in helix $n$.

If rails $R^6$, $R^7$, of section B are occupied and bridged by the wheels and axles of a train and the current of batteries D, D′, thereby be shunted, relay M cannot then be energized and the safety signal will not be given, when the locomotive reaches rail $R^2$ of section A. Should the signal I indicate safety before the locomotive reaches rail $R^2$, the engineer will know that such signal is improper and is due to either armature lever $l$ being held by residual magnetism of iron cores of helices $m$, $m'$, or improper working of circuit controller governed by N or by defective signal mechanism, and therefore he will proceed cautiously over section B. It is obvious that if wire $w$ of relay M is connected by wire 13 with wire F, then either helix $m$ or $m'$ thereof when included in the track circuit of section B by circuit controller N and energized by batteries D or D′, will be in an independent metallic circuit, embracing line of rails $R^6$ or $R^7$ battery D or D′ and wire F and at the same time both helices $m$, $m'$, both lines of rails $R^6$, $R^7$, and both batteries D, D′, are in the ordinary metallic circuit herein before described. Helix $m$ or $m'$ will also be in a ground circuit embracing the ground connections, E, between the wires, $f$, and 13; those nearest wire, $f$, constituting with portion of wire F, one earth terminal, and those nearest wire 13 constituting with portion of wire F, the other earth terminal. It is evident that with such circuits the resistance and retardation offered to the current of batteries D, D′, will be greatly reduced and the flow thereof over helices $m$, $m'$, will be increased while the flow thereof via the wooden ties, ballast and moist earth in a ground shunt will be reduced to a minimum, thereby enabling the rails of a longer section of track to be used for automatic signaling than has heretofore been possible.

When relay M is not employed in connection with conductor F, wire $f$ at end $b'$ could be dispensed with and the induced electricity of the track circuit attending a lightning discharge solely discharged into wire F and the earth via arresters Z, Z′.

I do not confine myself to the employment of the arresters Z, Z′ with the two legs of a track circuit, at the battery end thereof, and in which the signal controlling relay at or ahead of the opposite end of track section is normally out of circuit, but also to such employment of arresters with the ordinary constant track circuit with such relay constantly connected with rails at opposite end of such track section, and with the track circuit shown in Fig. 1 when a signal controlling relay is substituted for resistance K, as herein set forth.

I do not confine myself to two arresters Z, Z′ as herein set forth, as a single arrester with two metal plates connected respectively with wires 1 and 6 or rails $R^6$ and $R^7$ and an intermediate metal plate connected with wire $f$ or F can be substituted.

I do not confine myself to the extended conductor F with ground connections E at intervals as the medium for discharging the induced electricity from a track circuit or circuits at the battery end thereof, simultaneous with a lightning discharge, as any other suitable ground connection or connections can be substituted.

I do not confine myself to the employment of an arrester or arresters and a ground connection adjacent to the battery in a rail circuit as herein set forth as it or they can be similarly employed with the battery end or portion of a signal circuit having a signal controlling magnet or magnets at an opposite end.

I do not confine myself to the employment of the circuit controller having an armature lever and metallic contacts insulated from such lever for making and breaking a rail circuit as it is also applicable to a signal circuit having a signal controlling magnet or magnets.

I do not confine myself to the means shown in Fig. 2 for insulating and separating the metallic contacts T, T' or a single contact from the armature lever nor to the employment of such contacts or contact with mercury as set forth.

In order to prevent the oxidation of the mercury and keep its surface bright and clean, tubes or bells $t$, $t'$, of glass or other nonconducting material should be employed as shown in Fig. 3 hermetically fastened at the top with the bent ends of wire T and the lower end thereof being open but always beneath the surface of the mercury thereby preventing the air entering the interior of tube and oxidizing the surface of mercury therein.

What I claim as new and desire to secure by Letters Patent is:

1. In a railway signaling system, the combination substantially as described, of rails of an insulated section of railway track, a generator connected with the farther end of said section, a resistance, normally in circuit, and a signal controlling relay, normally out of circuit, located ahead of the near end of the said section and means adapted for controlling the connections of the said resistance and relay for excluding the resistance and including the relay and causing the operation of the latter.

2. In a railway signaling system, the combination substantially as described, of rails of an insulated section of railway track, a generator connected with the farther end of said section, a resistance, normally in circuit and a signal controlling relay, normally out of circuit, located ahead of the near end of said section and means governed by a passing train adapted for controlling the connections of the said resistance and relay for excluding the resistance and including the relay and causing the operation of the latter.

3. In a railway signaling system, the combination substantially as described, of rails of an insulated section of railway track, a generator connected with the farther end of said section, an indicator, normally in circuit, and a signal controlling relay, normally out of circuit, located ahead of the near end of said section and means governed by a passing train adapted for controlling the connections of the said indicator and relay for excluding the indicator and including the relay, and causing the successive operation of the indicator and relay.

4. In a railway signaling system, the combination substantially as described, of the rails of an insulated section of railway track, a generator connected with the farther end of said section, an indicator, normally in circuit and a signal controlling relay, normally out of circuit, located ahead of the near end of said section, a circuit controller adapted for excluding the indicator and including the relay and vice versa and means controlled by a locomotive for operating the circuit controller.

5. In a railway signaling system, the combination, substantially as described of the rails of an insulated section of railway track, a generator connected with the farther end of said section, a resistance, normally in circuit and a signal controlling relay, normally out of circuit, located ahead of the near end of said section, and a circuit controller having contacts with immersion points and bodies of mercury adapted for excluding the resistance and including the relay and vice versa.

6. In a railway signaling system, the combination substantially as described of the rails of an insulated section of railway track, a generator connected with the farther end of said section, an indicator, normally in circuit and a signal controlling relay, normally out of circuit, located ahead of the near end of said section and a circuit controller having contacts with immersion points and bodies of mercury, adapted for excluding the indicator and including the relay, and vice versa.

7. In a railway signaling system, the combination substantially as described, of rails of an insulated section of railway track, a generator connected with the farther end of said section, a signal controlling relay, normally out of circuit, located ahead of the near end of said section and a circuit controller adapted for successively including and excluding the relay.

8. In a railway signaling system, the combination substantially as described, of rails of an insulated section of railway track, a generator connected with the farther end of said section, a signal controlling relay, normally out of circuit, located ahead of the near end of said section, a circuit controller adapted for including and excluding the relay, and means controlled by a locomotive for operating the circuit controller.

9. In a railway signaling system, the combination substantially as described, of rails of an insulated section of railway track, a generator connected with the farther end of said section and a signal controlling magnet located at or ahead of the near end of said section, and a connection with the ground at or near the generator.

10. In a railway signaling system, the combination substantially as described, of rails of an insulated section of railway track, a generator connected with the farther end of said section and a signal controlling relay, normally out of circuit, located at or ahead of the near end of said section, and a connection with the ground at or near the generator.

11. In a railway signaling system, the combination substantially as described, of an electric circuit having a generator connected with the farther end of said circuit, a signal controlling relay located at or ahead of the near end of said circuit, of a connection with the ground at or near the generator.

12. In a railway signaling system, the combination substantially as described, of rails of an insulated section of railway track, a sectional generator connected with the farther end of said section, an indicator or signal controlling relay normally in circuit and located at or ahead of the near end of said section, of a connection or connections with the ground taken at a point or points between sections of generator.

13. In a railway signaling system, the combination substantially as described, of rails of an insulated section of railway track, a sectional generator connected with the farther end of said section, of an indicator or signal controlling relay normally in circuit and located at or ahead of the near end of said section, of a connection or connections with extended conductor, F, connected at short intervals with ground connections, E, and taken at a point or points between sections of generator.

14. In a railway signaling system, the combination substantially as described, of rails of an insulated section of railway track, a sectional generator connected with the farther end of said section and a signal-controlling relay, normally out of circuit, located at or ahead of the near end of said section, of a connection or connections with extended conductor, F, connected at short intervals with ground connections, E, and taken at a point or points between the sections of generator.

15. In an electric railway signaling system, the combination of a track circuit and a relay, of means for breaking and closing connection of both terminals of said relay with the two sides of said track circuit respectively.

16. In a railway signaling system, the combination substantially as described, of rails of an insulated section of railway track having a generator connected with the farther end of said section, and a signal controlling relay, normally disconnected as to both its terminals and located at or ahead of the near end of said section and a circuit controller and means governed by a passing train for operating said circuit controller to include said relay in circuit as the train approaches said section.

17. In a railway signaling system, the combination substantially as described of rails of an insulated section of railway track, a sectional generator connected with the farther end thereof, a signal controlling relay M, normally out of circuit located ahead of the near end of said section, an extended conductor F, wires $f$ and 13 respectively connected with wire $d$, between sections of said generator and wire $w$, between coils of said relay and with said extended conductor and a circuit controller adapted to successively include and exclude said relay.

18. In a railway signaling system, the combination substantially as described, of rails of an insulated section of railway track, a sectional generator with the farther end thereof, a resistance normally in circuit and a signal controlling relay M, normally out of circuit, located ahead of the near end of said section, extended conductor F, wires $f$ and 13 respectively connected with wire $d$, between sections of said generator and wire $w$, between coils of said relay and with said extended conductor, and a circuit controller adapted to exclude the resistance and include the relay and vice versa.

19. In a railway signaling system, the combination substantially as described, of rails of an insulated section of railway track, a sectional generator connected with the farther end of said section, and a signal controlling relay, normally out of circuit located ahead of the near end of said section, an extended conductor, F, connected at short intervals with ground connections E, wires $f$ and 13, respectively connected with wire $d$, between sections of said generator and wire $w$, between coils of said relay and with said grounded conductor, and a circuit controller adapted to successively include and exclude the said relay.

20. In a railway signaling system, the combination substantially as described, of rails of an insulated section of railway track, a sectional generator connected with the farther end of said section, a resistance normally in circuit, and a signal controlling relay normally out of circuit and located ahead of the near end of said section, extended conductor, F, connected at short intervals with ground connection, E, wires $f$ and 13 respectively connected with wire, $d$, between sections of said generator and wire $w$, between coils of said relay and with said grounded conductor, F, and a circuit controller adapted to exclude the resistance and include the relay and vice versa.

21. The combination with sectional generators respectively connected with the farther ends of sectional lines of rails of consecutive block sections, of connections taken at points between the sections of said generators with a conductor F, extending along railroad and connected at short intervals with ground connections, E, substantially as shown and described.

22. The combination with sectional generators, respectively connected with the farther ends of sectional lines of rails of consecutive block sections and signal controlling relays normally in circuit located at or ahead of the near ends of said sections, of connections taken at points between the sections of generators with a conductor, F, extending along railroad and connected at short intervals with ground connections, E, substantially as shown and described.

23. The combination with sectional lines of rails of consecutive block sections, of sectional generators connected with the farther ends of said sections, and signal controlling relays, normally out of circuit, located at or ahead of the near ends of said sections, connections respectively taken at points between the sections of generators and wire coils of relays with a conductor, E, extending along railroad and connected at short intervals with ground connections F, and circuit controllers adapted to successively include and exclude said relays.

24. The combination with sectional lines of rails of consecutive block sections of sectional generators connected with farther ends of said sections, resistances, normally in circuit, and signal controlling relays, normally out of circuit, located ahead of the near ends of said sections, connections respectively taken at points between the sections of generators and wire coils of relays with a conductor, F, extending along railroad and connected at short intervals with ground connections, E, and circuit controllers adapted to successively include resistances and exclude said relays and vice versa.

25. In a railway signaling system, the combination substantially as described, of rails of an insulated section of railway track, having a generator connected with the farther end of said section, an indicator, normally in circuit, and a signal controlling relay, normally out of circuit, located ahead of the near end of section and a circuit controller adapted to exclude the indicator and include the relay, and by the simultaneous operation of the indicator and signal controlled by said relay, safety is indicated to an approaching engineer.

26. An electric circuit having a magnet or relay under control of an electromagnetic circuit controller consisting of movable insulated contacts with immersion points and non-metallic bells, and stationary bodies of mercury, in which the said bells are constantly immersed substantially as shown and described.

27. In a railway signaling system, the combination with an electric circuit having a generator connected with farther end of said circuit, a signal controlling magnet, normally in circuit, located at or ahead of the near end of said circuit, of arresters Z, Z', connected with the ground and both legs of said circuit adjacent to the generator substantially as shown and described.

28. In a railway signaling system, the combination with the rails of an insulated section of railway track, having a generator connected with farther end of said section, and a signal controlling magnet, normally in circuit, located at or ahead of near end of said section, of arresters Z, Z', connected with the ground and both legs of said circuit adjacent to generator, substantially as shown and described.

29. In a railway signaling system, the combination with an electric circuit, having a generator connected with farther end of said circuit, and a signal controlling magnet, normally in circuit at or ahead of the near end of said circuit, of arresters Z, Z', connected with extended conductor F, with ground connections E, at short intervals and both legs of said circuit adjacent to the generator, substantially as shown and described.

30. In a railway signaling system, the combination with the rails of an insulated section of railway track having a sectional generator connected with the farther end of said section, a signal controlling relay normally out of circuit, located at or ahead of the near end of said section of generator and arresters Z, Z', connected with extended conductor, F, connected at short intervals with ground connections and with both legs of said circuit adjacent to the generator substantially as shown and described.

Signed at New York in the county of New York and State of New York, this 9th day of January, A. D. 1903.

HENRY W. SPANG.

Witnesses:
J. GALLWITZ,
E. L. LAWLER.